(12) United States Patent
Hoellriegl (10) Patent No.: US 11,530,098 B2
(45) Date of Patent: Dec. 20, 2022

(54) SPACING STAR WHEEL FOR TRANSPORTING AND TRANSFERRING CONTAINERS

(71) Applicant: KRONES AG, Neutraubling (DE)

(72) Inventor: Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/285,871

(22) PCT Filed: Aug. 14, 2019

(86) PCT No.: PCT/EP2019/071798
§ 371 (c)(1),
(2) Date: Apr. 15, 2021

(87) PCT Pub. No.: WO2020/078603
PCT Pub. Date: Apr. 23, 2020

(65) Prior Publication Data
US 2021/0380351 A1   Dec. 9, 2021

(30) Foreign Application Priority Data

Oct. 17, 2018 (DE) ................ 10 2018 217 776.7

(51) Int. Cl.
*B65G 47/86* (2006.01)
*B65G 29/00* (2006.01)
(Continued)

(52) U.S. Cl.
CPC ...... *B65G 47/847* (2013.01); *B29C 49/42069* (2022.05); *B65G 29/00* (2013.01); *B65G 43/10* (2013.01); *B65G 2201/0244* (2013.01)

(58) Field of Classification Search
CPC ...... B65G 47/847; B65G 29/00; B65G 43/10; B65G 47/08; B65G 47/26; B65G 47/846;
(Continued)

(56) References Cited

U.S. PATENT DOCUMENTS 2,007,981 A * 7/1935 Nordquist ............... A23L 3/001
198/474.1
8,202,079 B2 * 6/2012 Litzenberg .......... B29C 49/4205
198/470.1
(Continued)

FOREIGN PATENT DOCUMENTS

| EP | 0801014 A1 | 10/1997 |
| JP | 2000072245 A | 3/2000 |
| WO | 2008106921 A1 | 9/2008 |

OTHER PUBLICATIONS

ISA European Patent Office, International Search Report Issued in Application No. PCT/EP2019/071798, dated Nov. 28, 2019, WIPO, 4 pages.

*Primary Examiner* — James R Bidwell
(74) *Attorney, Agent, or Firm* — McCoy Russell LLP (57) ABSTRACT

The invention relates to a spacing star wheel for transporting and transferring containers, comprising a plurality of gripping elements for gripping one container each and a curve guide, where the spacing star wheel is configured such that, during operation, the gripping elements, guided by the curve guide, revolve around the axis of rotation of the spacing star wheel along a curved path. By activating at least one curve guide segment, the shape of the curve guide can be adjusted such that the spacing distance between two adjacent gripping elements in the region of the curve guide segment changes.

20 Claims, 7 Drawing Sheets

(51) Int. Cl.
*B65G 43/10* (2006.01)
*B29C 49/42* (2006.01)

(58) Field of Classification Search
CPC ..... B65G 1/1378; B67C 7/0053; B67C 3/242;
B29C 49/421
USPC ...................................................... 198/459.2
See application file for complete search history.

(56) References Cited

U.S. PATENT DOCUMENTS

| | | | |
|---|---|---|---|
| 8,770,382 B2* | 7/2014 | Tas | B65G 47/244 |
| | | | 198/377.07 |
| 2010/0077703 A1* | 4/2010 | Gourlaouen | B65G 47/847 |
| | | | 53/473 |
| 2013/0146421 A1* | 6/2013 | Zoni | B65G 47/5136 |
| | | | 198/608 |
| 2016/0347556 A1* | 12/2016 | Fahldieck | B65G 47/847 |

* cited by examiner

SPACING STAR WHEEL FOR TRANSPORTING AND TRANSFERRING CONTAINERS

CROSS REFERENCE TO RELATED APPLICATIONS

The present application is a U.S. National Phase of International Application No. PCT/EP2019/071798 entitled "DIVIDING STAR WHEEL FOR TRANSPORTING AND TRANSFERRING CONTAINERS," and filed on Aug. 14, 2019. International Application No. PCT/EP2019/071798 claims priority to German Patent Application No. 10 2018 217 776.7 filed on Oct. 17, 2018. The entire contents of each of the above-listed applications are hereby incorporated by reference for all purposes.

TECHNICAL FIELD

The invention relates to a spacing star wheel for transporting and transferring containers, comprising a plurality of gripping elements for gripping one container each and a curve guide, where the spacing star wheel is configured such that, during operation, the gripping elements, guided by the curve guide, revolve around the axis of rotation of the spacing star wheel along a curved path.

BACKGROUND AND SUMMARY

For the transfer to rotary machines in which the containers are processed, for example fillers or labelers, it is known for container treatment systems to use a spacing star wheel to make containers assume the spacing distance required for being transferred to the treatment station. For this purpose, the spacing distance of the spacing star wheel in the transfer region of the container and the spacing distance of the rotary machine are synchronized. If a container treatment system is to process different container formats, then the situation arises in some cases that a different number of the treatment stations, for example, blowing stations of the blow-molding machine, in one of the machines of the system arranged upstream in the production flow, for example, a blow-molding machine for shaping the containers from a preform, is used, for example, every station in a first operating mode and only every second or every third in a second operating mode. If, for example, only every second treatment station on a machine is used, it is said that it is running at half the load.

A spacing star wheel is typically provided and configured such that in one operating mode, for example, when fully loaded, it makes the containers assume the spacing distance that is required for the subsequent machine (when this machine is fully loaded). However, if the machine arranged upstream is to be operated with half the load and the spacing star wheel is used unchanged, then gaps arise in the flow of containers that continue via the spacing star wheel into the downstream machine, so that not all stations are then occupied in this machine either.

These gaps can only be closed if a suitable spacing star wheel is used for each operating mode. For example, the spacing star wheel must bring about a smaller spacing change for a full load than for half a load. Therefore, the spacing distance in partial regions of the spacing star wheel must also be different for different operating modes. In order to change the spacing distance of a spacing star wheel, for example, for a format change, it has hitherto been known to replace the curve guide, often in the form of a curve disk, of the spacing star wheel and/or to adapt the number of gripping elements. This means that complex conversion is required, which also results in a relatively long downtime of the system. In addition, a separate curve disk is required for every operating mode, which leads to high acquisition costs. Separate actuation of each transport element of the spacing star wheel is also possible, which, however, requires a great deal of effort, especially in order to obtain the precision required.

If it is intended to operate with exactly two different spacing distances (e.g. for processing two different container formats), it is alternatively possible to work with the same spacing star wheel or the same curve guide, respectively. For example, already in the rotary machine arranged (upstream), either only every second position can be occupied and, accordingly, only every second position can also be occupied in subsequent rotary machines as well as the spacing star wheels. This means that replacement of the spacing star wheel or the curve guide, respectively, can be dispensed with. However, this then has the consequence that these rotary machines have to be configured to be very large. In addition, this still achieves relatively little flexibility.

It is therefore the object of the invention—without having to configure a machine larger than necessary—to ensure greater flexibility with regard to the spacing distance, in particular to simplify the changeover to a different spacing distance and to reduce long downtimes.

This object is satisfied with the spacing star wheel of claim 1. The invention provides in particular a spacing star wheel for transporting and transferring containers, comprising a plurality of gripping elements for gripping one container each and a curve guide, where the spacing star wheel is configured such that, during operation, the gripping elements, guided by the curve guide, revolve around the axis of rotation of the spacing star wheel along a curved path, where the shape of the curve guide can be adjusted by activating at least one curve guide segment such that the spacing distance in the region of the curve guide segment between two adjacent gripping elements changes. During operation of the spacing star wheel, the previous spacing distance course of two adjacent gripping elements is therefore changed by adjusting the curve guide.

The spacing star wheel claimed therefore enables greater flexibility, where no complex conversion work or long downtimes are required because a changeover to a different spacing distance can be done quickly and in a simple manner by activating or deactivating the curve guide segment. It is also not necessary to configure the machines to be particularly large.

The spacing star wheel typically comprises a rotation element which can be rotated around the axis of rotation, for example, a rotary disk, which is driven during operation such that it rotates around the axis of rotation. The gripping elements are connected to the rotation element such that they are entrained by the rotation element during operation. However, the gripping elements are not connected to the rotation element in a positionally fixed manner and with a fixed orientation. In addition to the gripping tools for gripping and holding the containers, the gripping elements comprise runners. The spacing star wheel is configured such that the runners are pressed from the outside or from the inside (in relation to the axis of rotation) against the curve guide and revolve around the axis of rotation in a manner guided by the curve guide. For example, the runners can comprise rollers that are pressed against the curve guide. Due to the fact that there is no positionally fixed connection present between the rotation element and the gripping elements, in particular the runners, the shape of the curved path that the runners run through is defined by the shape of the curve guide. Pressing against the curve guide can be achieved, for example, by ways of tension springs.

A curve guide is accordingly a component or a component group which is arranged and configured around the axis of rotation such that, when runners revolving around the axis of rotation are pressed against the curve guide, the runners are forced to take a path that is prescribed by the shape of the curve guide. The curve guide can comprise rods, rails, and/or plates The shape of the curve guide, the shape of the curve guide segment, and the shape of the base element are therefore intended in this application to mean the shape which prescribes or defines the curved path that the gripping elements run through. This is the respective region against which the runners are pressed.

When the runners are pressed against the curve guide from the outside (in relation to the axis of rotation), i.e., the outer shape of the curve guide defines the shape of the curved path that is run through, then this is referred to as outer guide. When the runners are pressed against the curve guide from the inside (in relation to the axis of rotation), i.e., the inner shape of the curve guide defines the shape of the curved path that is run through, then this is referred to as the inner guide.

The gripping tools themselves can be actuated actively or passively, for example, they can be tongs.

The curve guide segment and the curve guide can be arranged in particular horizontally.

As explained above, the shape of the curve guide can be adjusted by activating a curve guide segment. By activating the curve guide segment, the shape of the curve guide can in particular be adjusted such that the shape of a curved path which the gripping elements run through changes in the region of the curve guide segment. This shall be explained later in detail below.

For the activation, the curve guide segment can be switched from a passive state to an active state, where the passive state and the active state differ in the position and/or alignment of the curve guide segment. The spacing distance in the region of the curve guide segment in the active state is different than in the passive state. Several different active states are also possible. The position and/or alignment of the curve guide segment in the passive state can in particular be such that it has no influence on the shape of the curved path when it is in the passive state.

In the present application, the spacing distance is the distance between the centers of action of adjacent gripping elements, in particular the centers of action of the respective gripping tools. This distance depends on the shape of the curved path that the gripping elements run through (and therefore also on the shape of the curve guide). The spacing distance does not have to be the same at every position of the gripping elements on the curved path. For example, the relative position and/or alignment of adjacent gripping elements can change along the curved path, which results in a change in the spacing distance. The curve guide can be configured in particular such that the spacing distance differs depending on the position of the respective gripping elements on the curved path. This means that the spacing distance can change according to the shape of the curved path when the curved path is run through.

The containers can be bottles, jars, or other containers that can be transported and processed in a rotary machine.

It goes without saying that changing the spacing distance in the present application means that the different spacing distances can each be adjusted using all gripping elements, i.e., for the same number of gripping elements, where all gripping elements are also arranged in an active position in which they grip and transport containers during operation.

The activation can comprise moving and/or pivoting the curve guide segment, in particular pivoting and/or moving in the horizontal direction. The spacing star wheel can then comprise, for example, at least one curve guide segment that can be pivoted in and out and/or at least one curve guide segment that can be slid in.

This means that the spacing distance can be varied by moving and/or pivoting the curve guide segment. This way of adjusting the spacing distance is relatively simple, does not require any changeover, and can be configured such that the spacing distance can be adjusted from outside the transport region of the spacing star wheel in which the containers are transported during operation, and/or can be done in an automated manner.

The curve guide segment can be arranged in particular above or below the base element or between an upper and a lower part of the base element. The spacing star wheel can be configured in particular such that the curve guide segment protrudes laterally at least in part over the base element as a result of the moving and/or pivoting. Presently, in particular, for the curve guide segment with an outside guide protruding laterally means protruding outwardly and for the curve guide segment with an inside guide protruding laterally means protruding inwardly with respect to the axis of rotation of the spacing star wheel beyond the base element.

The spacing star wheel can comprise in particular at least one bearing which is configured and arranged such that the curve guide segment is mounted to be pivotable by way of the bearing. Alternatively or in addition, the spacing star wheel can comprise at least one guide, for example, comprising at least one rod or rail, by way of which and/or along which the curve guide segment is movable. Alternatively or in addition, the curve guide segment can be mounted on at least one vertically and movably arranged support element such that the curve guide segment is activated by moving it together with the support element. The curve guide segment can be in particular mounted to be rotatable on two support elements such that the position and/or the alignment of the curve guide segment can be adjusted by moving the two support elements.

The curve guide segment can be activated in an automated manner, in particular be movable and/or pivotable in an automated manner. This enables the curve guide segment to be activated quickly and precisely.

The spacing star wheel can comprise a drive, in particular a hydraulic drive and/or a pneumatic drive and/or a motor drive, for the activation in particular in an automated manner, in particular for moving and/or pivoting the curve guide segment.

The drive can be arranged in particular outside the transport region of the containers. The drive can be actuatable by way of a control device of the spacing star wheel and/or an external control device, where the control device is configured such that it controls the drive such that the curve guide segment is made to assume various predetermined positions and/or orientations, in particular the active state or the passive state. In this way, the spacing distance in the region of the curve guide segment can be adjusted in an automated manner.

Alternatively or in addition, the curve guide segment can be coupled to an external drive which, for example, is part to other system parts.

The curve guide can comprise a base element, the shape of which defines a first curved path when the curve guide segment is not activated, and the curve guide segment can be activated such that, when the curve guide segment is activated, the shape of the curve guide segment and the shape of the base element together define a second curved path that differs from the first curved path, in particular with regard to the associated spacing distance. Here, the spacing distance differs in particular in the region of the curve guide segment.

As an alternative thereto, the shape of the curve guide segment and the shape of the base element can together define the (first) curved path when the curve guide segment is activated as well as when the curve guide segment is not activated.

The spacing star wheel can comprise a or the first curve guide segment, respectively, a second curve guide segment, and a or the base element, respectively. The first curve guide segment can be activated such that when the first curve guide segment is activated and the second curve guide segment is not activated, the shape of the first curve guide segment and the shape of the base element together define a or the second curved path, respectively. In addition, the second curve guide segment can be activated such that, when the second curve guide segment is activated and the first curve guide segment is not activated, the shape of the second curve guide segment and the shape of the base element together define a third curved path that differs from the second curved path, in particular with regard to the associated spacing distance. Here, the spacing distance differs in particular in the region of the first and the second curve guide segment.

The first curve guide segment and the second curve guide segment can be configured and arranged, in particular in the above embodiment, such that only one of the curve guide segments can be activated at a time. This has the advantage that an unforeseen curved path does not accidentally arise due to incorrect operation when both curve guide segments are activated.

In particular, the first and the second curve guide segment can be mechanically coupled to one another such that the activation of one curve guide segment deactivates the other curve guide segment. Deactivation can there mean that the deactivated curve guide segment is made to assume the passive state described above. Such mechanical coupling is simple and reliable, for example, for the reason that no corresponding actuation of drives is required.

The configurations described above with two curve guide segments can be implemented in particular with pivotable curve guide segments.

The curve guide segment or all curve guide segments, respectively, can be activated, in particular manually and/or in an automated manner, without intervention in the spacing star wheel, in particular by way of transmission elements that are formed to transmit a drive force for activation to the curve guide segment or segments, respectively.

The spacing distance can then be changed without access to the spacing star wheel, for example, when changing tool fittings. In particular, this also enables use in an aseptic machine.

The transmission elements can comprise at least one adjustment rod which in particular extends vertically downwardly from the curve guide, where the adjustment rod is configured in particular to pivot and/or move the curve guide segment or segments, respectively.

For this purpose, the adjustment rod can be coupled to the curve guide segment or segments, respectively, by way of coupling elements appropriately configured and arranged, so that the position and/or alignment of the curve guide segments can be adjusted merely by moving the adjustment rod.

The invention also relates to a container treatment system comprising the spacing star wheel described above. The container treatment system further comprises a first container treatment machine, in particular a blow-molding machine, arranged upstream of the spacing star wheel during operation, and a second container treatment machine, for example, a labeler and/or a filler, arranged downstream of the spacing star wheel during operation. The spacing star wheel is configured and arranged such that, when the spacing distance is changed at the outlet of the first container treatment machine, then the spacing distance in the second container treatment machine can be maintained by activating the curve guide segment. The container treatment machines can be, in particular, rotary machines.

The invention also relates to a method for changing the format of a spacing star wheel, comprising a plurality of gripping elements for gripping one container each and a curve guide, where the spacing star wheel is configured such that, during operation, the gripping elements, guided by the curve guide, revolve around the axis of rotation of the spacing star wheel along a curved path. The method comprises that a curve guide segment is activated or deactivated, so that the shape of the curve guide is adjusted such that the spacing distance between two adjacent gripping elements in the region of the curve guide segment changes.

The activation can comprise moving and/or pivoting the curve guide segment, in particular pivoting and/or moving in the horizontal direction. The curve guide segment can be activated in an automated manner, in particular moved and/or pivoted in an automated manner. The activation of the curve guide segment or all of the curve guide segments can take place, in particular manually and/or in an automated manner, without intervention in the spacing star wheel.

The invention also relates to a method for operating the container treatment system described above. The method comprises treating the containers in the first container treatment machine, in particular blow-molding the containers, and transferring the containers from the first container treatment machine to the spacing star wheel, in particular via a discharge star wheel that is arranged between the first container treatment machine and the spacing star wheel. Furthermore, the method comprises transferring the containers from the spacing star wheel to the second container treatment machine, in particular via an infeed star wheel which is arranged between the spacing star wheel and the second container treatment machine. The operation includes at least a first operating mode in which each treatment station of the first container treatment machine is occupied and a second operating mode in which not every, in particular only every $n^{th}$ (where n is an integer greater than 1, in particular 2) treatment station of the first container treatment machine is occupied, where the spacing distance in the second container treatment machine is the same for the first operating mode and the second operating mode.

Transfer of the containers from the first container treatment machine to the spacing star wheel can be effected directly or via a discharge star wheel of the first container treatment machine. Transfer of the containers from the spacing star wheel to the second container treatment machine can be effected directly or via an infeed star wheel of the second container treatment machine.

This means that either only the spacing star wheel can be arranged between the first and the second container treatment machine or an infeed star wheel and/or a discharge star can be arranged in addition to the spacing star wheel.

This means that, even if several containers are treated simultaneously in the first container treatment machine in the first operating mode and the flow of containers in the outlet of the first container treatment machine is denser than in the second operating mode, the flow of containers at the inlet of the second container treatment machine can be without a gap in both operating modes, i.e., be equally dense.

It goes without saying that the features and advantages mentioned in the context of the spacing star wheel can also be used or apply to the container treatment system and the method.

BRIEF DESCRIPTION OF THE FIGURES

Further features and advantages shall be explained below using the exemplary figures, where.

DETAILED DESCRIPTION

Figure 1:
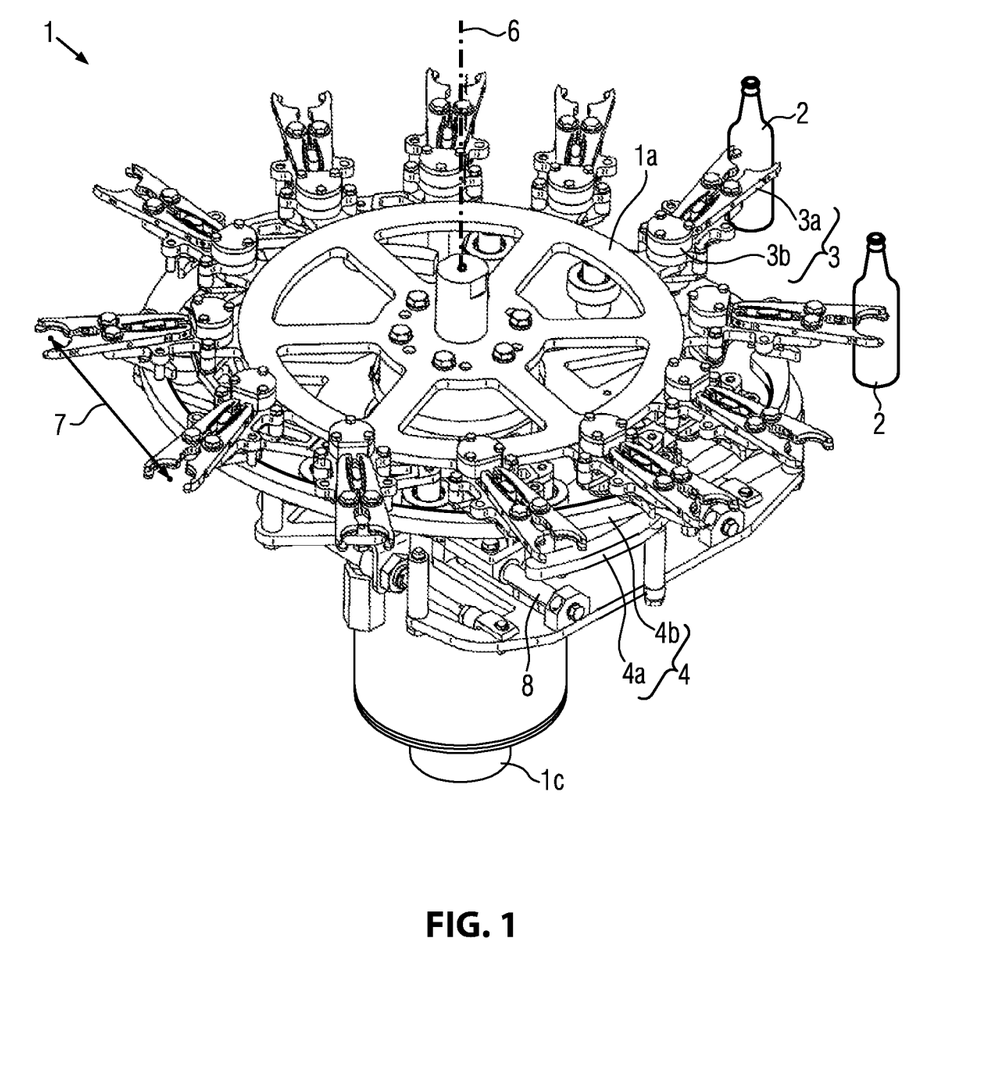
FIG. 1 shows a schematic oblique view not true to scale from above onto the spacing star wheel according to a first embodiment.
Figure 2:
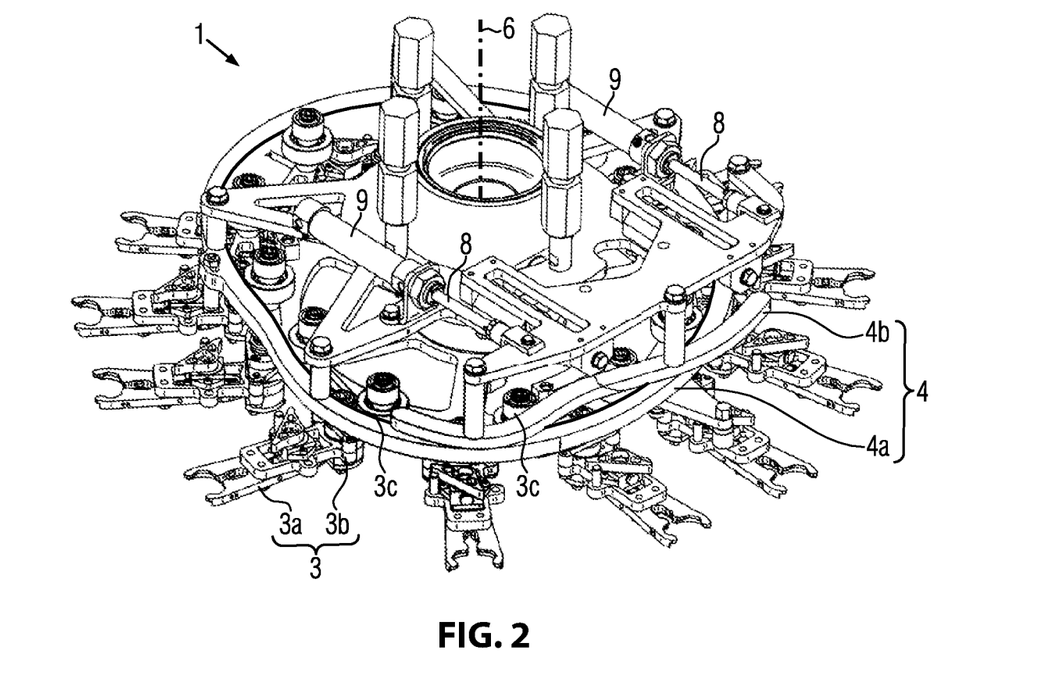
FIG. 2 shows a schematic oblique view not true to scale from below onto the spacing star wheel according to the first embodiment.

FIGS. 1 and 2 show oblique views from below and from above onto a spacing star wheel 1 according to a first embodiment (where above or above refers to the arrangement of the spacing star wheel provided for operation).

The spacing star wheel is configured to transport and transfer containers 2, bottles are presently indicated by way of example, and comprises a plurality of gripping elements 3 for gripping one container each and a curve guide 4 which in this example comprises a base element 4a and a curve guide segment 4b.

The curve guide segment is there arranged, for example, below the base element. This has the advantage that it is comparatively easy to attach. However, it is also conceivable to have it arranged above the base element.

Figure 3:
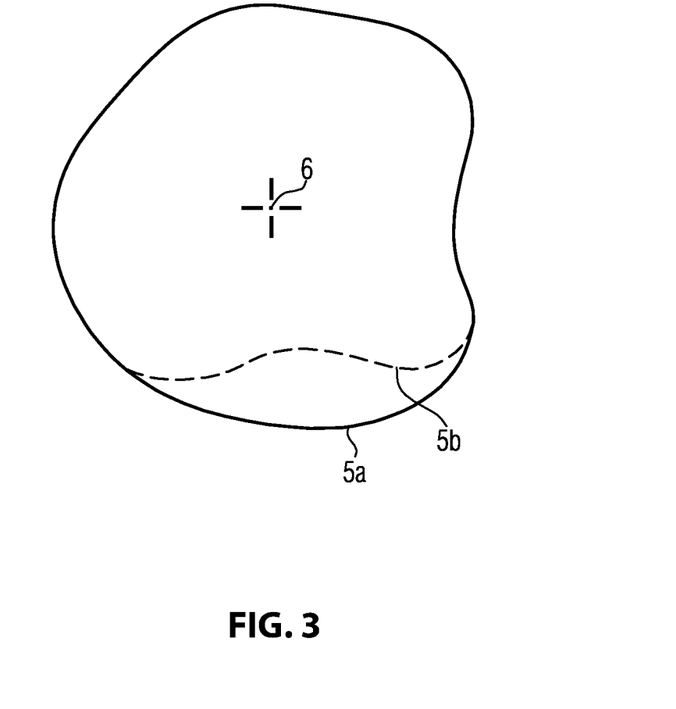
FIG. 3 shows a schematic representation not true to scale of two different curved paths.

The spacing star wheel is configured such that, during operation, the gripping elements revolve around axis of rotation 6 of the spacing star wheel guided by the curve guide along a curved path 5a or 5b, which are shown schematically in FIG. 3.

The spacing star wheel comprises a rotation element, presently, for example, in the form of a rotation plate 1a, which can be rotated around the axis of rotation. In addition, the spacing star wheel comprises a drive 1c which is configured to drive the rotation plate in a rotating manner. The gripping elements are connected to the rotation plate such that they are entrained by the rotation plate during operation when the latter rotates. The gripping elements comprise gripping tools 3a, presently, for example, in the form of tongs, for gripping and holding the containers. They also comprise runners 3b which in this example comprise rollers 3c. Several rollers are there arranged one above the other, where one roller is arranged to interact with on the base element and one roller is arranged to interact with the curve guide segment. The interaction can comprise pressing against the curve guide.

In this embodiment there is, for example, an inner guide present. This means that the runners, in particular their rollers, are pressed against the curve guide from the inside and the inner shape of the curve guide defines the shape of the curved path that the gripping elements run through. Alternatively, however, an outer guide can also be used. In this example, pressing against the curve guide is effected by way of torsion springs. However, other pressing mechanisms, for example, coil springs, are also conceivable.

By activating the curve guide segment, the shape of the curve guide can be adjusted such that the spacing distance 7 between two adjacent gripping elements in the region of the curve guide segment changes. In the case of the inner guide presently shown, the curve guide segment in the activated or active state protrudes inwardly (with respect to the axis of rotation) over the base element. As a result, the runners in this region run on a curved path farther inside.

The curve guide segment is there arranged such that it can be moved horizontally for the activation. In the present example, the spacing star wheel comprises guide elements 8, presently, for example, in the shape of rods, by way of which the curve guide segment is movable. It is also conceivable that the movable arrangement is configured differently, for example, in that the curve guide segment is mounted on slidable, for example, vertically arranged holding elements.

The spacing star wheel can optionally comprise a drive 9 which is coupled to the curve guide segment by way of guide elements 8 and drives it in such a way that the curve guide segment is movable by way of the drive for activation or deactivation, respectively. For example, the drive can comprise an electric motor, a hydraulic drive, or a pneumatic drive.

FIG. 3 shows two different curved paths, curved path 5a in which the curve guide segment is deactivated, and curved path 5b in which the curve guide segment is activated.

In a deactivated state or passive state of the curve guide segment, the gripping elements run along first curved path 5a. In the embodiment shown there, the shape of the curved path in the passive state is defined solely by the shape, presently the inner shape, of the base element of the curve guide.

In an activated state or active state, the curve guide segment protrudes laterally, in this example, towards the inside, over the base element. In the region in which the curve guide segment protrudes over the base element, the shape of the curve guide segment defines the shape of the curved path. In the remaining regions, the shape of the base element continues to define the curved path. In the active state, (second) curved path 5b is therefore defined by the shape (presently the inner shape) of the base element and by the shape (presently the inner shape) of the curve guide segment.

As can be gathered from FIG. 3, curved paths 5a and 5b differ. The spacing distance in the region in which the curved paths differ, i.e., in the region of the curve guide segment, in the active state therefore differs from the passive state. This means that by activating the curve guide segment, the spacing distance in the region of the curve guide segment is changed.

It is presently to be noted that the shape of the base element and the curve guide segment is shown purely schematically and by way of example and that there is no restriction to this specific shape.

Figure 4:
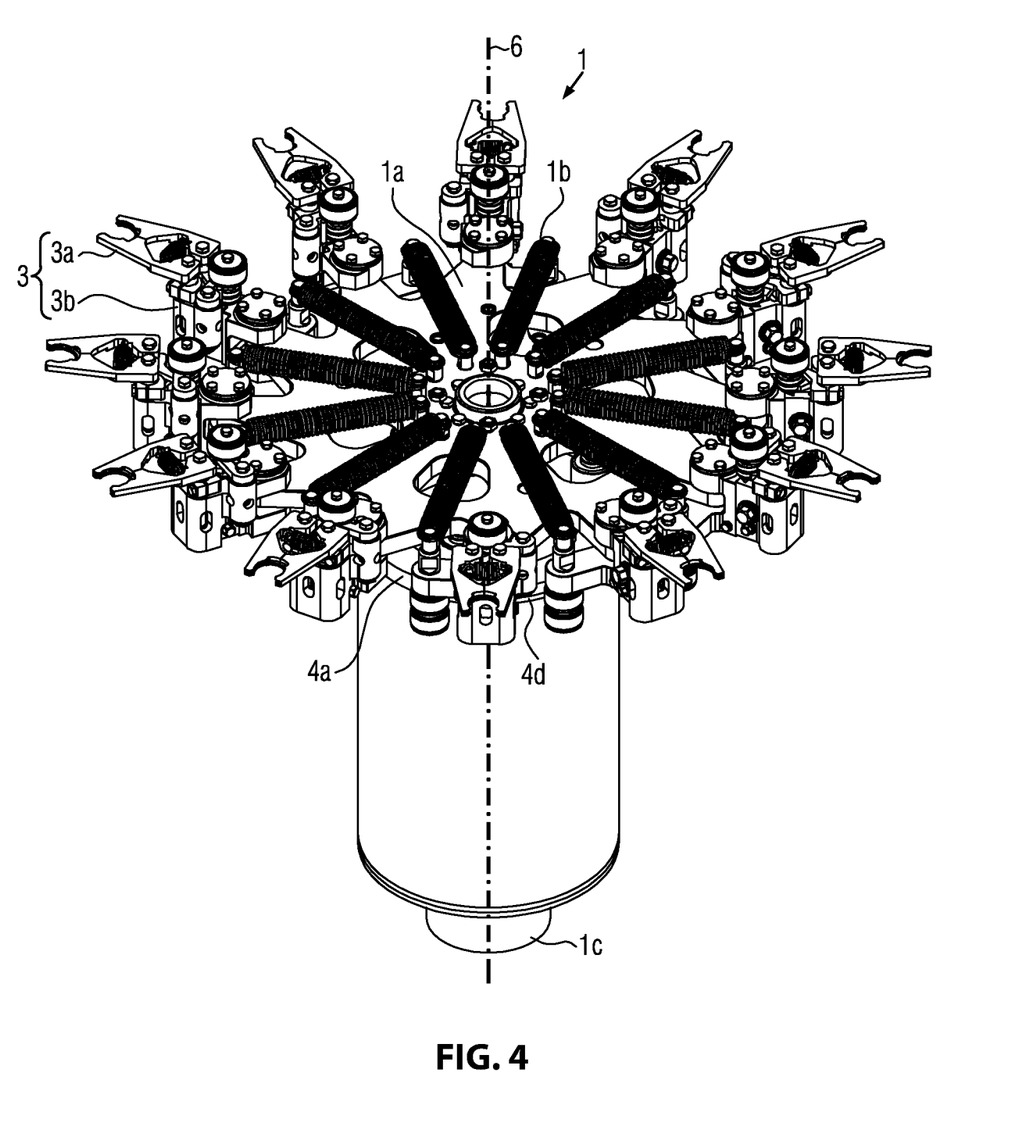
FIG. 4 shows a schematic oblique view not true to scale from above onto the spacing star wheel according to a second embodiment.
Figure 5:
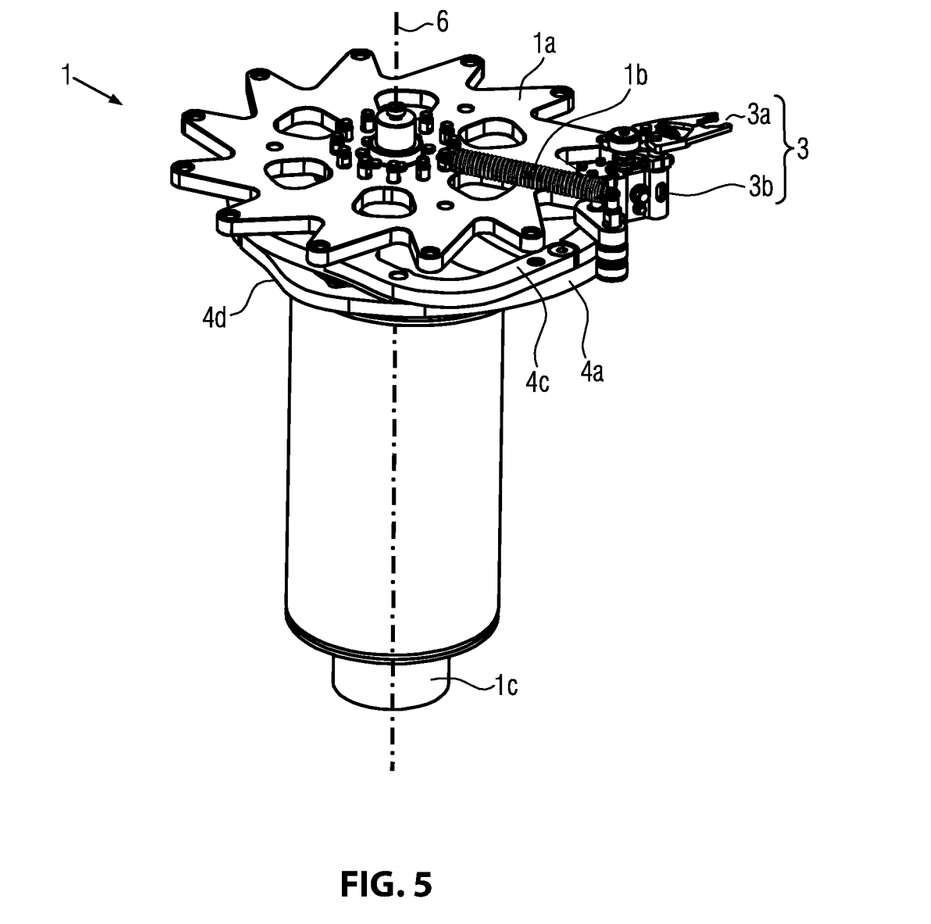
FIG. 5 shows a schematic oblique view not true to scale from above onto a part of the spacing star wheel according to a second embodiment.
Figure 6A:
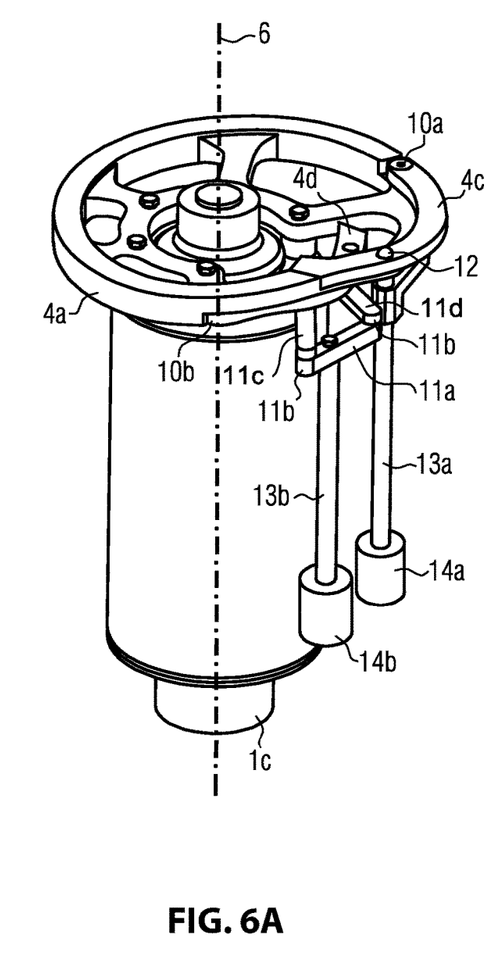
FIGS. 6A and 6B show a schematic oblique view not true to scale from above onto a part of the spacing star wheel according to the second embodiment.
Figure 6B:
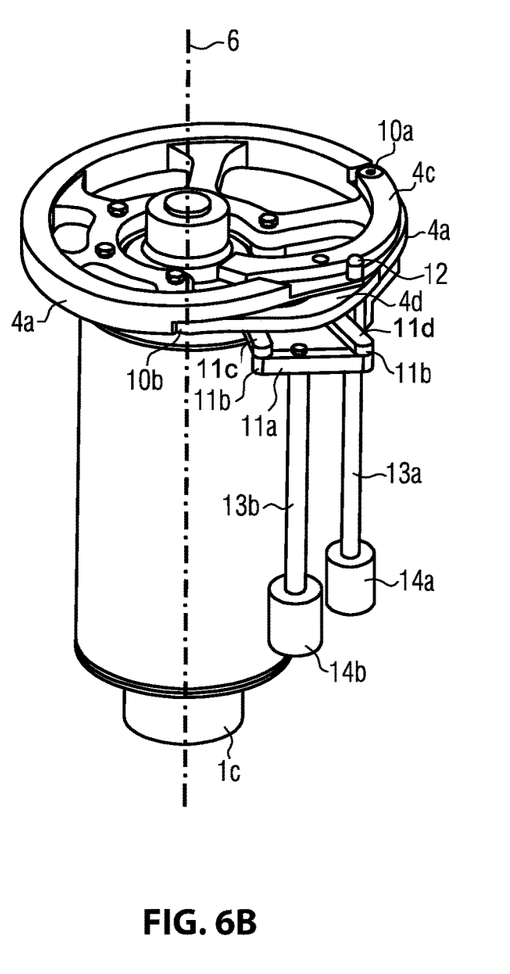

A second embodiment for a spacing star wheel 1 is shown in FIGS. 4 to 6. Components identical or similar to the first embodiment are there marked with the same reference characters. FIG. 4 shows an oblique view from above (where above relates to the arrangement of the spacing star wheel provided for operation). FIGS. 5 and 6 show views of the second embodiment in which some elements from FIG. 4 are not shown for the sake of clarity, so that the curve guide is better visible. FIGS. 6A and 6B additionally show optional rods 13a and 13b and corresponding drives 14a and 14b (see below).

In contrast to the first embodiment, there is an outer guide present in the second embodiment. This means that the runners, in particular their rollers, are pressed against the curve guide from the outside and the outer shape of the curve guide defines the shape of the curved path. However, an inner guide is also conceivable. Pressing against the curve guide is there effected by way of tension springs (coil springs) 1b. However, other pressing mechanisms are also conceivable.

According to the second embodiment, the spacing star wheel, in particular curve guide 4, comprises two horizontally pivotable curve guide segments 4c and 4d in addition to base element 4a. First pivotable curve guide segment 4c is arranged above the base element and second curve guide segment 4d is arranged below the base element. However, it is also conceivable that both curve guide segments are arranged above or below the base element. In their respective active state, the curve guide segments protrude outwardly (with respect to the axis of rotation) over the base element. In the passive state, the curve guide elements do not protrude laterally over the base element.

Here as well, two curved paths of different shapes arise, similar to what is the case in the first embodiment (see above all FIG. 3). The first curved path arises when first pivotable curve guide segment 4c is activated and second pivotable curve guide segment 4d is deactivated. The shape of the base element and the shape of first pivotable curve guide segment 4c then together define the shape of the first curved path. The second curved path arises when first pivotable curve guide segment 4c is deactivated and second pivotable curve guide segment 4d is activated. The shape of the base element and the shape of first pivotable curve guide segment 4d then together define the shape of the second curved path. The different shape of the curved path also leads to different spacing distances in this region.

In this embodiment, the base element has a height profile on the upper side which is formed such that the upper side of the base element and the upper side of first curve guide segment 4c are flush with one another. In addition, the base element has a height profile on the underside which is formed such that the underside of the base element and the underside of second curve guide segment 4d are flush with one another. Such a height profile enables a very space-saving arrangement, but is optional.

In this embodiment, the base element comprises, for example, two bearings 10a and 10b, where first curve guide segment 4c is mounted to be pivotable by way of first bearing 10a and second curve guide segment 4d is mounted to be pivotable by way of second bearing 10b. Different mounting, in particular a mounting that is formed to be independent of the base element is also conceivable. The two curve guide segments are there each mounted at one end, and the other end can be pivoted. The pivotable ends of the two curve guide segments point towards one another. This arrangement is advantageous in this special embodiment because there is a mechanical coupling present, described below, between the two curve guide segments. However, it is also conceivable that the pivotable ends point away from one another or that the pivotable end of one of the curve guide segments points towards the mounted end of the other curve guide segment.

As shown in FIGS. 6A and 6B, the two curve guide segments in this embodiment can by way of example be mechanically coupled to one another, namely such that the activation of one curve guide segment deactivates the other curve guide segment. Such coupling is optional, but can simplify the changeover under certain circumstances because no separate control is required. In this case, the coupling is effected by way of the coupling elements. Such coupling elements can comprise in particular rods 11a which are connected by joints 11b.

As shown in FIGS. 6A and 6B, the spacing star wheel can optionally comprise a locking element 12 for locking the curve guide segments, presently for example, in the form of a centering pin. Several locking elements can also be provided and the locking element or elements can also be configured in other ways, for example, in the form of stoppers. It is also possible to dispense with locking elements entirely, for example, in the case of active control of the position of the curve guide segments.

In the present example, both curve guide segments comprise a recess each at their pivotable end, where the shape of the recess matches that of the centering pin such that the centering pin locks the curve guide segment when it is inserted into the recess. Either exactly one centering pin can be provided, as presently shown, or several centering pins can be provided, for example, at least one centering pin for each curve guide segment.

A locking mechanism is shown in the present embodiment by way of example in which the centering pin engages in the recess of the curve guide segment that is in the active state or is activated, respectively, and affixes it. Alternatively or in addition, it is also possible to provide at least one centering pin which engages in the recess in the passive state.

In addition, the spacing star wheel in the present embodiment is configured in particular such that the centering pin, when it affixes the second curve guide segment in the activated state, at the same time blocks a pivoting motion of the first curve guide segment in the direction of the active state. This can be achieved as presently, for example, in that the recess in the second curve guide segment is configured to have the shape of a passage opening for the centering pin and the centering pin protrudes upwardly through the passage opening so far that it is arranged laterally adjacent to the first curve guide segment when it affixes the second curve guide element in the activated state, so that it blocks a motion of the first curve guide segment outwardly, i.e., in the direction of the active state. However, such a design of the locking mechanism is optional.

In FIGS. 6A and 6B, the centering pin is connected to a locking rod 13a, in particular one that extends vertically downwardly. The coupling mechanism, in particular rod 11a, is connected to an adjustment rod 13b which extends in particular vertically downwardly. The locking rod is there configured and arranged for insertion and withdrawal of the centering pin by raising or lowering the locking rod. Adjustment rod 13b is configured and arranged for activation or deactivation of the curve guide segments by moving rod 13b. Adjustment rod 13b is there firmly connected to center coupling rod 11a by way of a nut. Center coupling rod 11a is connected by a joint 11b to coupling rod 11c, which in turn is connected to first curve guide segment 4c. At the same time, center coupling rod 11a is connected to coupling rod 11d via a further joint 11b, which is connected to second curved segment 4d. This results in a toggle lever which, when actuated by drive 14b, sets a curve segment to be active or passive. In FIG. 6A, first curve guide segment 4c is set to be active, while second curve guide segment 4d is set to be passive due to the toggle lever. The principle is inverse in FIG. 6B. First curve guide segment 4c is set to be passive, while second curve guide segment 4d is set to be active. However, such adjustment rods are optional. They are particularly advantageous where the spacing distance is to be changed without intervention in the transport region, in particular in aseptic machines. The locking rod 13a can optionally be connected to a drive 14a for raising and lowering locking rod 13a. Adjustment rod 13b can optionally be connected to a drive 14b for moving adjustment rod 13b. The drives can be configured, for example, in the form of pneumatic or hydraulic drives or in the form of a motor, in particular an electric motor.

A method according to the invention for changing the format of a spacing star wheel shall be described below by way of example for the two above-described variants of a spacing star wheel.

In the case of the spacing star wheel from the first embodiment, the format change takes place in that curve guide segment 4b is moved by way of drive 9 until it protrudes laterally over base element 4a. Since the inner shape of the curve guide in this embodiment defines the shape of the curved path, the curve guide segment protrudes laterally inwardly relative to the axis of rotation when it is in the active state. The curve guide segment is therefore moved towards the axis of rotation or inwardly, respectively. The shape of the curved path and thereby also the spacing distance in the region of curve guide segment 4b is therefore changed and adapted to the new format. In order to switch back to the previous format, the curve guide segment is moved in the opposite direction, i.e., away from the axis of rotation, so that it no longer protrudes laterally over the base element.

If the spacing star wheel was alternatively configured such that the outer shape of the curve guide defines the curved path of the gripping elements, then a movement would take place away from the axis of rotation, i.e., outwardly, in order to make the curve guide segment assume an active state.

In the case of the spacing star wheel according to the second embodiment, a format change can take place by switching between the activated state of first curve guide segment 4c, as shown in FIG. 6A, and second curve guide segment 4d, as shown in FIG. 6B.

The case in which second curve guide segment 4d is activated for the first container format shall be presently described by way of example (FIG. 6B). In order to carry out a change to a second container format, centering pin 12 is drawn downwardly by way of drive 14a and rod 13a out of the recess in the second curve guide segment. The latter is now no longer affixed.

Second rod 13b is moved in the horizontal direction by way of drive 14b. As a result, second curve guide segment 4d is pivoted to the passive state by appropriately coupling to rod 13b. Due to the coupling, first curve guide segment 4c is at the same time pivoted to the active state, i.e., is activated. Rod 13a is subsequently guided upwardly again so that the centering pin engages in the recess in the first curve guide segment.

Figure 7A:
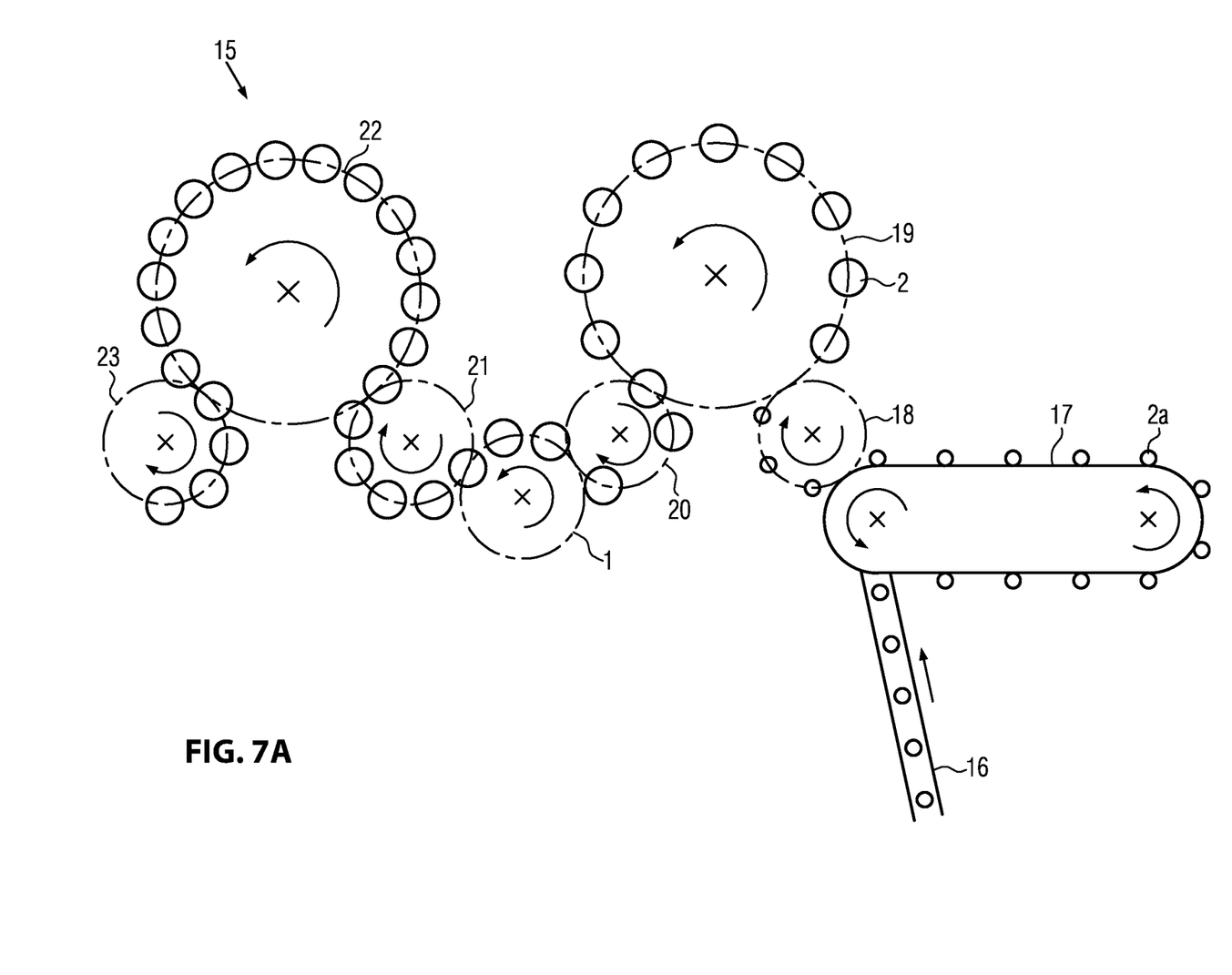
FIGS. 7A and 7B show two schematic top views not true to scale of a container treatment system with different loads.
Figure 7B:
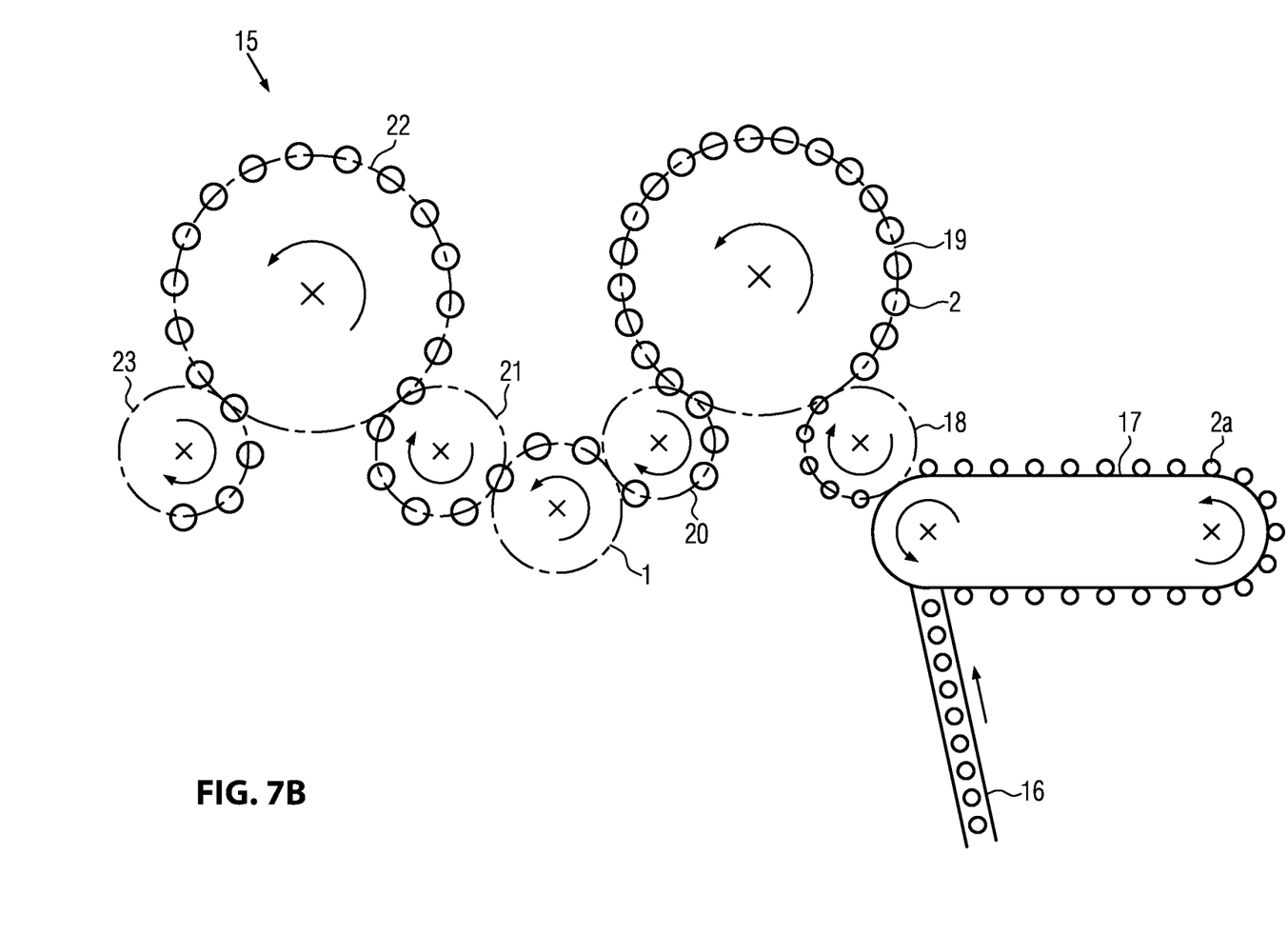

FIGS. 7A and 7B show two top views onto a container treatment system 15 which comprises a spacing star wheel 1 according to the invention, in particular one of the spacing star wheels described above. In addition, the container treatment system presently comprises a system section for blow-molding containers 2 from preforms 2a which in turn has a preform feed 16, a heating section 17 for heating the preforms, an infeed star wheel 18, a first container treatment machine 19, presently, by way of example a blow-molding machine, and a discharge star wheel 20.

Infeed star wheel 18 is arranged at the inlet of the blow-molding machine and receives preforms from the heating section during operation and transfers them to the blow-molding machine. Discharge star wheel 20 is arranged in the outlet of the blow-molding machine and receives containers from the blow-molding machine during operation and transfers them to the spacing star wheel.

The container treatment system presently further comprises an infeed star wheel 21, a second container treatment machine 22, presently a filler, and a discharge star wheel 23, where infeed star wheel 21 is arranged at the inlet of the filler and receives containers from the spacing star wheel during operation and transfers them to the filler, and where the discharge star wheel receives containers from the filler. Alternatively or in addition to the filler, a labeler or another machine for treating containers can also be provided, in particular respectively also with an associated infeed star wheel and a discharge star wheel which each transfer containers to the former and receive containers from the former.

It is be noted that container treatment machines 19 and 22 can also be different machines and that the preform feed, the heating section, and the various infeed and discharge star wheels are optionally provided. Further elements, in particular transport elements, between the container treatment machines can also be optionally provided.

FIG. 7A shows the container treatment system with half a load, and FIG. 7B shows the container treatment system with a full load. For example, these loads can be used for containers of different sizes, for example for 1.5 l containers (half a load) or 0.5 l containers (full load).

As is evident, there are already larger gaps between the preforms in the preform feed and in the heating section when half loaded. When the blow-molding machine is half loaded, only every second blow-molding station is occupied. In the downstream filler, however, the same number of containers are shown for half and full loads, i.e., the spacing in this machine is always the same. Gaps in the flow of containers that arise in the outlet from the blow-molding machine with half a load are closed by the spacing star wheel.

For this purpose, a curve guide segment can be activated or deactivated in the spacing star wheel, as described above, in order to suitably adapt the spacing distance in dependence of the load with which the system is operated.

As an alternative to the arrangement shown in FIGS. 7A and 7B, it is also possible that only spacing star wheel 1 itself is arranged between two consecutive container treatment machines 19 and 22, in particular between the blow-molding machine and the subsequent container treatment machine. In this case, the spacing star wheel also assumes the function of a discharge star wheel for container treatment machine 19 arranged upstream and the function of the infeed star wheel for container treatment machine 22 arranged downstream.

It is also possible that spacing star wheel 1 and only one further star wheel are arranged between two consecutive container treatment machines 19 and 22, in particular between the blow-molding machine and the downstream container treatment machine. In particular, only an infeed star wheel 21 of container treatment machine 22 arranged downstream or a discharge star wheel 20 of container treatment machine 19 arranged upstream can be arranged in addition to spacing star wheel 1 between the two container treatment machines. In this case, spacing star wheel 1 also assumes the function of an infeed star wheel for container treatment machine 19 arranged downstream or of the discharge star wheel for container treatment machine 22 arranged upstream.

Further elements, in particular transport elements, can also be optionally provided between the container treatment machines.

An exemplary method for operating a container treatment system comprising a spacing star wheel according to the invention, in particular the container treatment system described above, preforms are fed to a heating section by way of the preform feed, are transported through the heating section and heated there, are fed to the blow-molding machine via infeed star wheel 18, and are there respectively formed into a container at a blow-molding station. The containers obtained in this manner are then received by the blow-molding machine by way of discharge star wheel 20 and transferred to spacing star wheel 1. The latter in turn transfers the containers (with a different spacing) to the infeed star wheel of a subsequent machine, for example, a labeler or a filler.

The operation comprises at least a first operating mode in which each treatment station of the first container treatment machine is occupied (FIG. 7B) and a second operating mode in which not every, in particular only every second, treatment station of the first container treatment machine is occupied (FIG. 7A). The spacing in the second treatment system is the same for the first operating mode and the second operating mode. When switching operating modes, the curve guide segment in particular is deactivated or activated.

It is understood that the features mentioned in the embodiments described above are not restricted to these specific combinations and are also possible in any other random combination.

The invention claimed is:

1. A spacing star wheel for transporting and transferring containers, comprising a plurality of gripping elements for gripping one container each and a curve guide,
    where said spacing star wheel is configured such that, during operation, said gripping elements, guided by said curve guide, revolve around an axis of rotation of said spacing star wheel along a curved path,
    wherein,
    by activating at least one curve guide segment, a shape of said curve guide can be adjusted such that a spacing distance between two adjacent gripping elements in a region of said curve guide segment changes.

2. The spacing star wheel according to claim 1,
    where said curve guide comprises a base element, the shape of which defines a first curved path when said curve guide segment is not activated, and
    where said curve guide segment can be activated such that, when said curve guide segment is activated, the shape of said curve guide segment and the shape of said base element together define a second curved path which differs from said first curved path.

3. The spacing star wheel according to claim 2, where said curve guide segment is arranged above or below said base element or between an upper and a lower part of said base element and is configured such that said curve guide segment is activated as a result of moving and/or pivoting.

4. The spacing star wheel according to claim 2, comprising a first curve guide segment, a second curve guide segment, and said base element,
    where said first curve guide segment can be activated such that, when said first curve guide segment is activated and when said second curve guide segment is not activated, the shape of said first curve guide segment and the shape of said base element together define said second curved path, and
    where said second curve guide segment can be activated such that, when said second curve guide segment is activated and when said first curve guide segment is not activated, the shape of said second curve guide segment and the shape of said base element together define a third curved path that differs from said second curved path.

5. The spacing star wheel according to claim 4, where said first curve guide segment and said second curve guide segment are configured and arranged such that only one of said curve guide segments can be activated at one time.

6. The spacing star wheel according to claim 5, where said first and said second curve guide segment are mechanically coupled to each other such that an activation of said one curve guide segment deactivates said other curve guide segment.

7. The spacing star wheel according to claim 1, where said curve guide segment or all curve guide segments, can be activated without intervention in said spacing star wheel by way of transmission elements.

8. The spacing star wheel according to claim 7, where said transmission elements comprise an adjustment rod.

9. The spacing star wheel according to claim 1, where the activation comprises moving and/or pivoting said curve guide segment.

10. The spacing star wheel according to claim 1, comprising a drive for the activation.

11. A container treatment system comprising the spacing star wheel according to claim 1 and a first container treatment machine arranged upstream of said spacing star wheel during operation, and a second container treatment machine arranged downstream of said spacing star wheel during operation, where said spacing star wheel is configured and arranged such that, when the spacing is changed in the outlet of said first container treatment machine, the spacing in said second container treatment machine can be maintained by activating said curve guide segment.

12. A method for changing the format of a spacing star wheel, comprising a plurality of gripping elements for gripping one container each and a curve guide, where said spacing star wheel is configured such that, during operation, said gripping elements, guided by said curve guide, revolve around the axis of rotation of said spacing star wheel along a curved path,
    wherein,
    a curve guide segment is activated or deactivated, so that the shape of said curve guide is adjusted such that the spacing distance between two adjacent gripping elements in the region of said curve guide segment changes.

13. The method according to claim 12, where the activation comprises moving and/or pivoting said curve guide segment.

14. The method according to claim 13, where the activation of said curve guide segment or all of said curve guide segments can be effected without intervention in said spacing star wheel.

15. The method for operating a container treatment system according to claim 11, comprising
- treating said containers in said first container treatment machine,
- transferring said containers from said first container treatment machine to said spacing star wheel,
- transferring said containers from said spacing star wheel to said second container treatment machine,
- where operating the container treatment system includes at least a first operating mode in which each treatment station of said first container treatment machine is occupied and a second operating mode in which not every treatment station of said first container treatment machine is occupied, and
- where the spacing in said second container treatment machine is the same for the first operating mode and the second operating mode.

16. The spacing start wheel of claim 10, wherein the drive comprises a hydraulic drive and/or a pneumatic drive and/or a motor drive.

17. The container treatment system of claim 11, wherein the first container treatment machine comprises a blow molding machine.

18. The container treatment system of claim 11, wherein the second container treatment machine comprises a labeler and/or a filler.

19. The method of claim 15, wherein the first container treatment machine comprises a blow molding machine.

20. The method of claim 15, where, in the second operating mode, only every $n^{th}$ treatment station of said first container treatment machine is occupied, wherein n is an integer greater than 1.

* * * * *